OVER-VOLTAGE PROTECTION TECHNIQUES

Filed Aug. 31, 1964 5 Sheets-Sheet 1

INVENTOR.
OLEY WANASELJA

BY
MORGAN, FINNEGAN, DURHAM & PINE

ATTORNEYS

INVENTOR.
OLEY WANASELJA
BY
MORGAN, FINNEGAN, DURHAM & PINE
ATTORNEYS

INVENTOR.
OLEY WANASELJA
BY
MORGAN, FINNEGAN, DURHAM & PINE
ATTORNEYS

INVENTOR.
OLEY WANASELJA
BY
MORGAN, FINNEGAN, DURHAM & PINE
ATTORNEYS

INVENTOR.
OLEY WANASELJA
BY
MORGAN, FINNEGAN, DURHAM & PINE
ATTORNEYS 3,281,625

OVER-VOLTAGE PROTECTION TECHNIQUES

Oley Wanaselja, Levittown, N.Y., assignor to Alfred J. Roach, Levittown, N.Y.

Filed Aug. 31, 1964, Ser. No. 393,257
14 Claims. (Cl. 317—9)

This invention relates to apparatus and methods for protecting equipment from over-voltage conditions and is particularly directed to over-voltage sensitive devices for attachment to electrical conductors serving various types of apparatus, for example, communication equipment. In an illustrative application the protection devices serves the purpose of protecting the equipment from the effects of excessive voltage such as might occur because of a fault, contact by high tension line, lightning and the like.

Of the various types of equipment presently employed for accomplishing the foregoing, each suffers from one or more disadvantage including excess size and cost, hazardous conditions during servicing, less-than-optimum reliability, maintenance difficulties, and loss of function in presence of sustained overload.

It is an object of the invention to overcome or substantially reduce the foregoing shortcomings and to this end the invention provides improvements in construction and performance leading to reductions in size and cost, simplifications in servicing, reduction in hazards, and an increase in reliability. Morever, in the techniques according to the invention, additional protection features are attained without significantly impairing the essential simplicity of the construction.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel processes, methods, steps, parts, combinations and improvements herein shown and described.

Serving to illustrate exemplary embodiments of the invention are the drawings of which:

Figure 1:
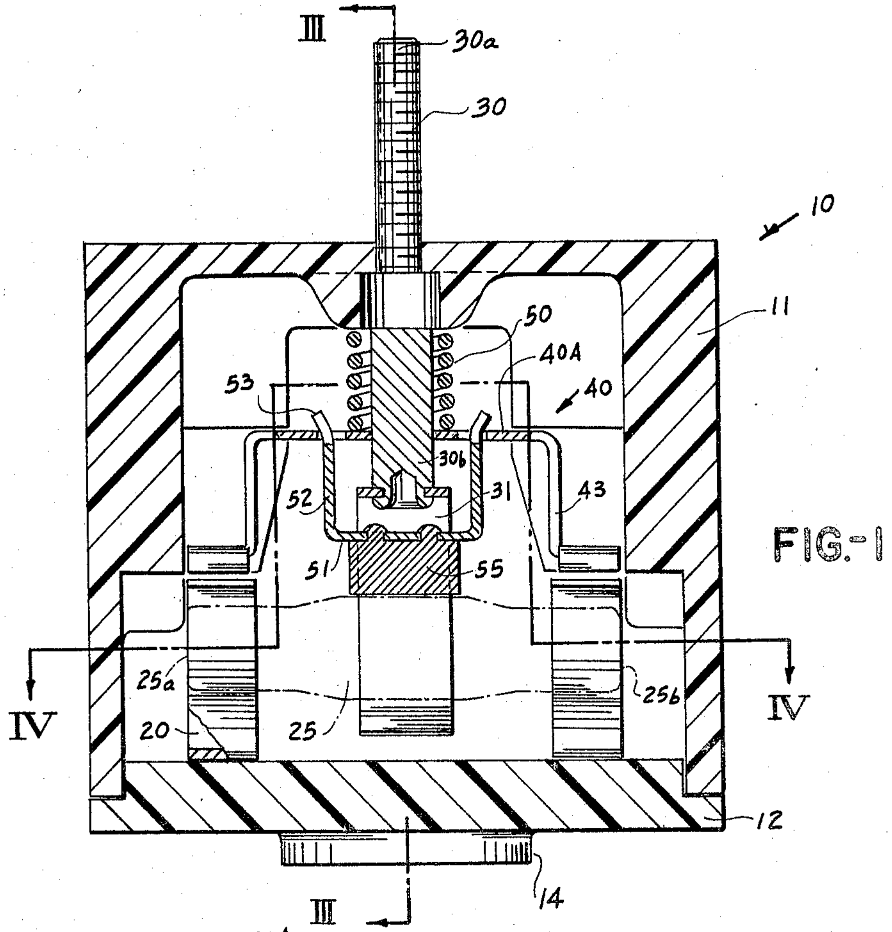
FIGURE 1 is an elevational cross-sectional view of one arrangement according to the invention.
Figure 2:
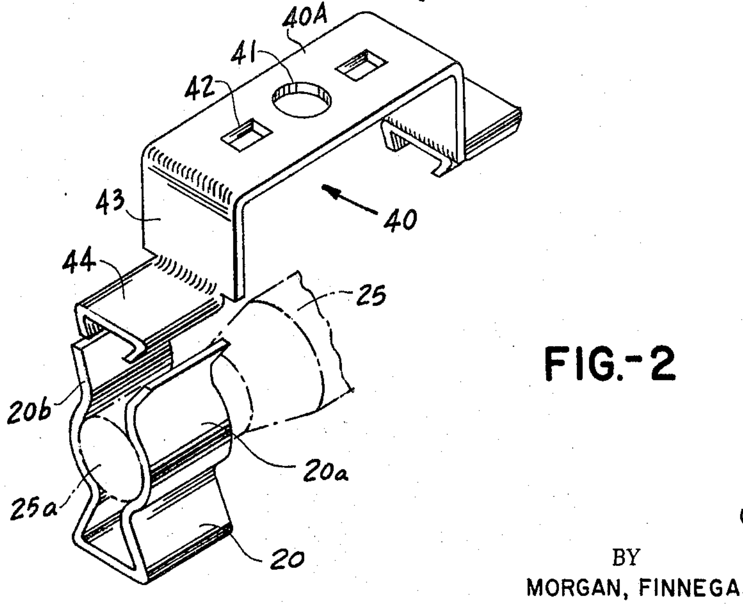
FIGURE 2 is an isometric detail view illustrating components of the device of FIGURE 1.
Figure 3:
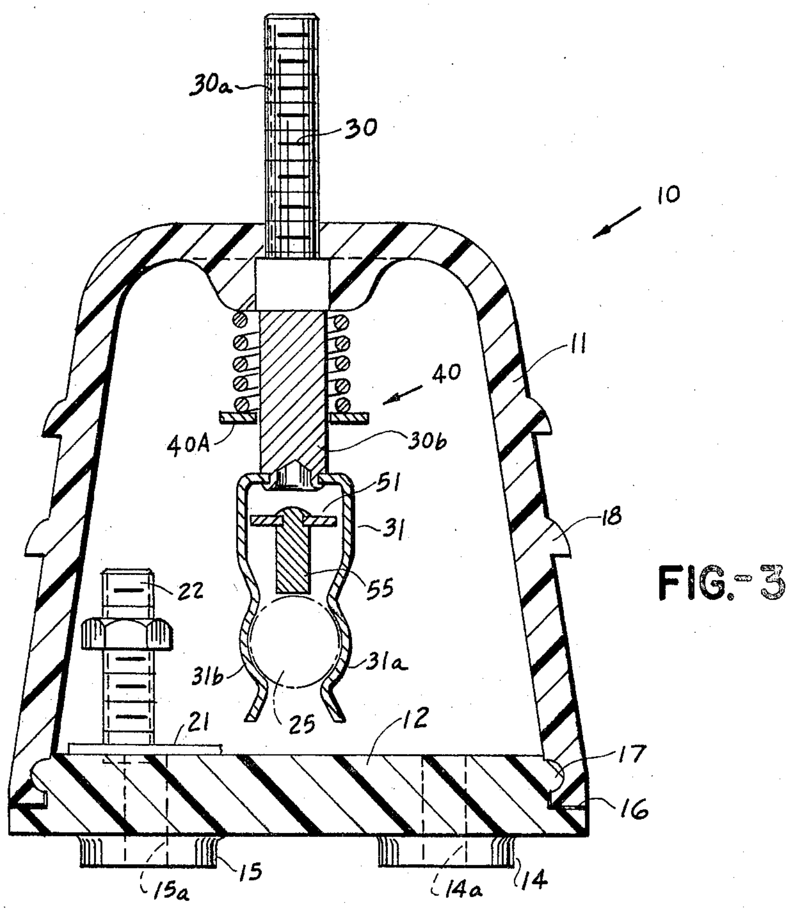
FIGURE 3 is an end elevational view partly in section of the protection arrangement of FIGURE 1.
Figure 4:
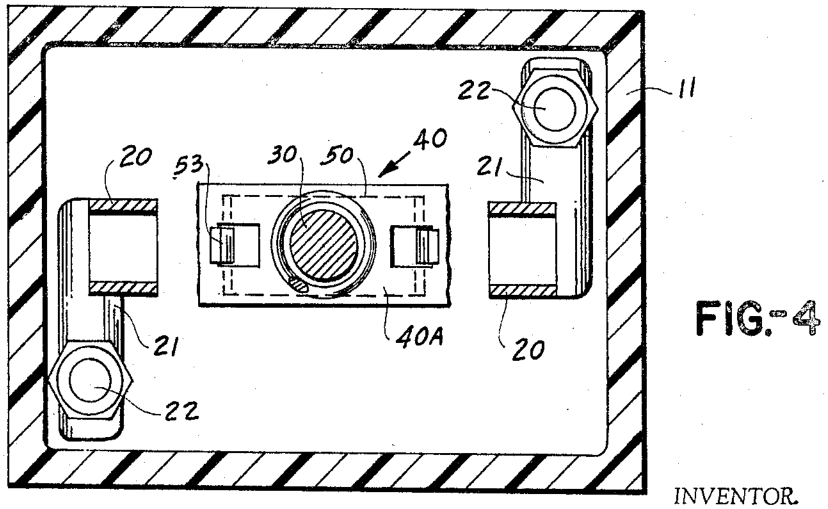
FIGURE 4 is a plan view, partly in section, taken along the lines IV—IV of FIGURE 1.

Referring to the embodiment of FIGURES 1–4, the arrangement therein illustrated comprises a housing assembly 10 which includes a snap-on cover 11 and a base 12. The housing assembly is illustratively constructed of Bakelite, is preferably weatherproof, and base 12 thereof including mounting pads 14 and 15.

Base 12 is provided with a shoulder portion 16 which receives the periphery of cover 11. The shoulder portion of the base also includes detents 17 for providing a releasable assembly of the cover to the base. The cover also includes finger grips 18 for facilitating disassembly.

Mounted on the base in aligned relationship and secured by suitable means are a pair of clips 20 each formed of spaced blades 20A and 20B. See FIGURE 2. Each clip 20 also includes an integral extension 21, to the distal end of which is secured by suitable means a terminal screw 22. The terminal screws are each adapted to mechanically and electrically connect one of the lines to be protected with the respective clip 20 via an associated lead (not shown) which is routed inside the assembly 10 and joined to the respective terminal screw. The clips 20 may be made of any suitable material; Phosphor bronze, spring brass or beryllium copper are satisfactory.

Figures 9, 11:
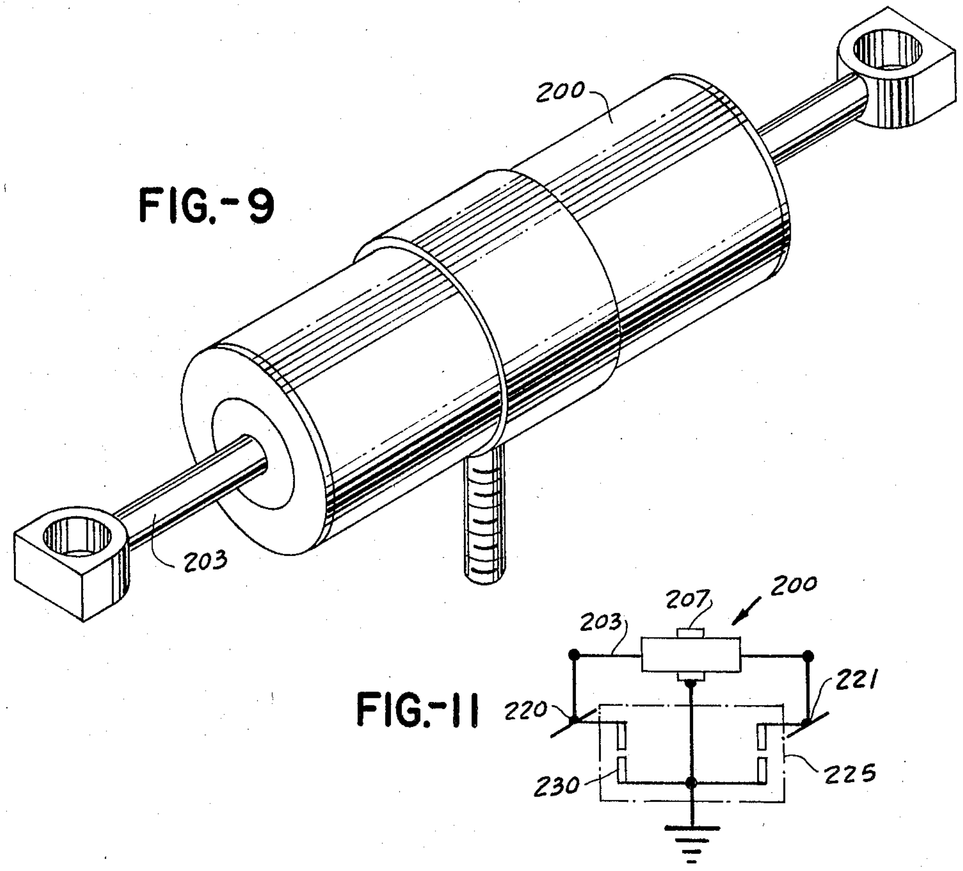
FIGURE 9 illustrates in isometric view, an over-voltage sensing element according to the invention.
FIGURE 11 is a schematic diagram illustrating the combination of the over-voltage element of FIGURES 9, 10 with an air-gap type protector.
Figure 10:
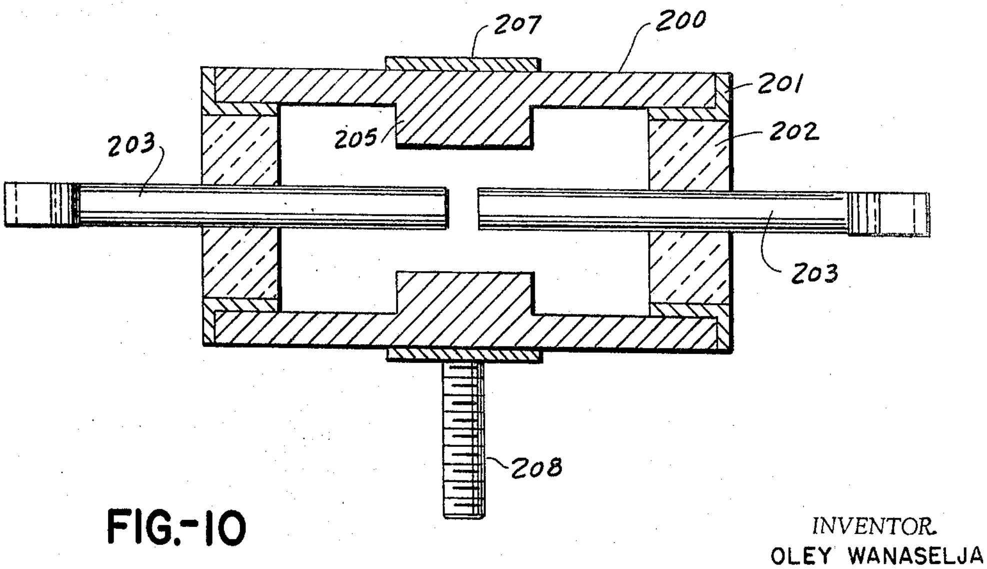
FIGURE 10 illustrates the element of FIGURE 9 in an elevational sectional view.

The clips 20 are aligned to receive the over-voltage element 25. In the embodiment illustrated in FIGURES 1–4, this over-voltage element is of known construction, being for example, an AEI type 16 gas tube protector. A cartridge of this type comprises a gas filled housing having a pair of opposed, spaced electrodes each of which makes electrical contact with one of the cartridge end contacts 25A and 25B. In the presence of an excessive voltage the gas between the electrodes is ionized thereby effectively shorting the end terminals 25A, 25B and connecting them to the case of the protector and to external ground as described below. The lines and equipment connected to these electrodes via the clips 20 are thus also short-circuited to thereby prevent the over-voltage condition from causing excessive current flow in the protected apparatus. Described more fully hereinafter in connection with FIGURES 9 and 10 is a gas-filled protector designed according to the invention.

Secured to cover 11 as by being press fitted thereto or molded therein is a ground stud 30 having an external threaded end 30A which is adapted to be electrically connected with a convenient ground potential point. The stud passes through the top of cover 11 and the interior end 30B thereof is connected, as by a rivet or by swaging, to a center clip 31 which is constructed of spaced fingers or blades 31A, 31B which resiliently grip the center portion of the over-voltage cartridge 25. The clip 31 is designed with a resilience which grips the cartridge 25 with a greater force than that which is provided by the end clips 20. By this relationship, a removal of the cover 11 automatically carries with it the cartridge 25 since the excessive grip of the center clip 31 causes the element 25 to be pulled from the clips 20 in the act of pulling the cover 11 from the base 12.

This arrangement provides an important feature of safety and ease of maintenance in the replacement of the cartridge. It may be seen that with cover 11 separated from base 12, the serviceman can safely and easily insert a new cartridge in the center clip 31 since it is isolated from the energized end clips 20. Hence the serviceman is not required to get close to the energized points but rather may work completely remote from these points. The safety aspect and functionality of this arrangement becomes particularly apparent when it is recalled that the removal of a defective cartridge from a "hot" circuit frequently requires special tools and, of course, must be done with extreme caution.

In the case of a prolonged over-voltage condition, there is a possibility that the gas tube or other protective element will fail. If the element becomes an open circuit, the equipment and lines connected thereto are no longer protected. To eliminate this possibility and to provide an extra measure of reliability and safety, the embodiment of FIGURES 1–4 includes a shorting arrangement described below.

Mounted in spaced relationship above the cartridge and clip assembly is a shorting bar 40 (see FIGURE 2) having a center bridge section 40A and a pair of sidewalls 43, forming with the bridge an inverted, generally U-shaped structure. The distal ends of the sidewalls 43 include channel shaped contactors 44 extending away from the sides and parallel with the center section 40A. It may be noted that the contacting sections 44 are each in spaced alignment with a respective end clip 20 and it may be further noted that the channel shape of the contactors 44 is such as to provide an effective electrical and resilient contact with the respective clip in the event that the shorting bar is depressed as described hereinafter.

The bridge section 40A includes a central bore 41 through which the ground stud 30 passes so that the shorting bar is slidable on the stud.

Collaxial on the stud is a spring 50, the lower end of which bears against the bridge section tending to urge the shorting bar against the clips 20. This action is resisted by an assembly which includes a U-shaped retainer 51 and fusible spacer 55.

The sides 52 of retainer 51 each include bent tongues 53 which extend into respective holes 42 in the bridge of shorting bar 40. The center section 51 of the retainer clip has secured thereto the fusible spacer 55 which depends from the center section and is secured thereto by appropriate means such as rivets or screws. The spacer 55 has its distal end abutting the center section of the cartridge 25. It may be seen that the tendency of spring 50 to push the shorting bar against the clips 20 is resisted by the retainer 51 and the fusible element.

In the presence of a prolonged surge which is sufficient to fuse the spacer 55, the spring 50 will thrust the shorting bar 40 downward so that the contactors 44 thereof contact the clips 20. When this occurs, a further direct short-circuit is established between the clips and between the lines connected thereto. Moreover, all of these points are grounded via lug 30. By this arrangement a sustained over-voltage condition which might otherwise burn out the protective cartridge 25, produces a supplementary shorting and grounding action. Hence, the equipment is protected even in the presence of sustained over-voltage conditions. Furthermore, it is grounded.

As in the case of removal of cartridge 25, the above-described arrangement facilitates the replacement of the shorting bar and related assembly since this assembly is connected to the cover 11 and is removed from the area of the energized clips when the housing cover 11 is removed usually, however, this assembly will not require replacement. Furthermore, by simply compressing the U-shaped retainer 51, it may be removed from the shorting bar 40 and replaced when the fusible spacer 55 has been expended.

The shorting bar 40 is preferably of copper or brass composition while the center clip 31 is conveniently formed from Phosphor bronze, spring brass or beryllium copper. The fusible element 55 may be lead, solder, babbit or other appropriate material in accordance with installation requirements and the ratings of the protector 25, the fusible element being designed to melt when the current rating of the over-voltage tube is exceeded.

An alternate embodiment is shown in FIGURES 5–8. As illustrated therein, the housing includes a cover 110 adapted to be releasably engaged with a base 112, detents 117 being employed (FIGURE 8) in analogous fashion to the detents of the first described embodiment.

Molded into the base assembly 112 are clips 120 which are designed to receive an over-voltage tube 125, which is of the same configuration as the corresponding tube of the previously described embodiment except that an evacuation tube 125A is also illustrated. To allow for this evacuation tube the clips 120 each include a slot 121.

The clips 120 are biased towards one another to provide resilient connection with the end contact caps 125B of the protector element.

Figure 5:
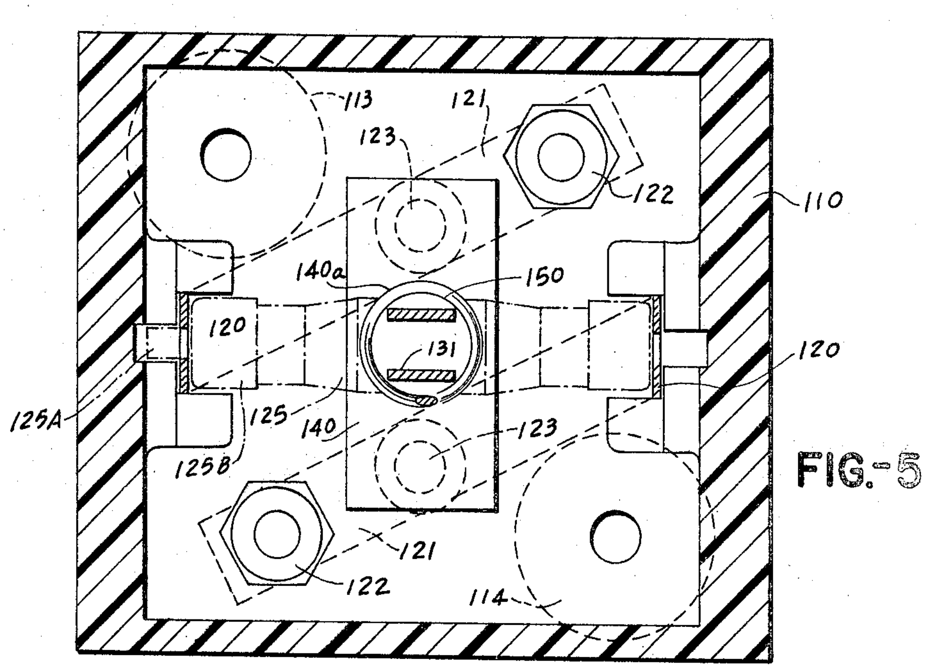
FIGURE 5 is a plan view, partly in section, of an alternate embodiment and is taken along the lines V—V of FIGURE 6.
Figure 6:
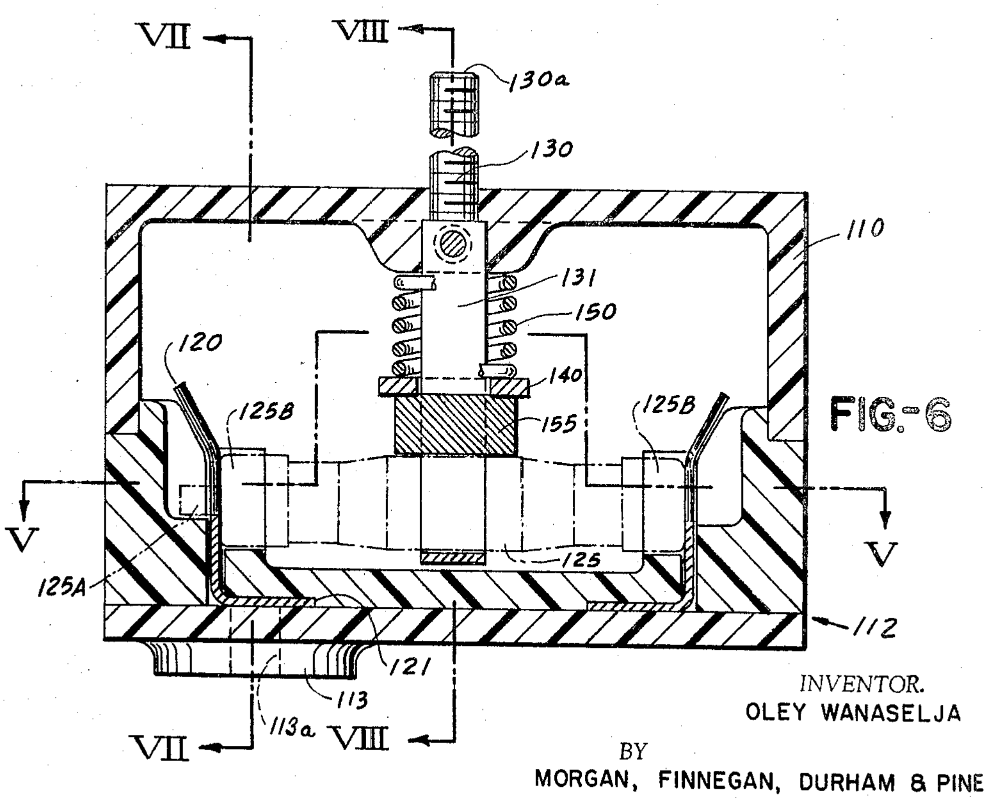
FIGURE 6 is an elevation view, partly in section, of the embodiment of FIGURE 5.
Figure 7:
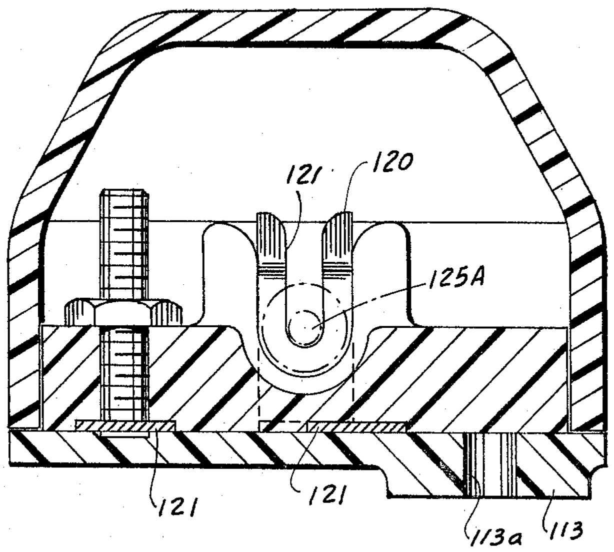
FIGURE 7 is a view taken along the lines VII—VII of FIGURE 6.

The base portion of each clip 120 includes an integral extenison 121 which is molded into the base 112 and angularly disposed with respect to the axis of the protection element 125 such that the terminal ends of these extensions are located in approximately diametric relative position as may be seen clearly in FIGURE 5. The end terminals are provided with threaded studs 122 to which the wires of the circuit to be protected are attached.

Figure 8:
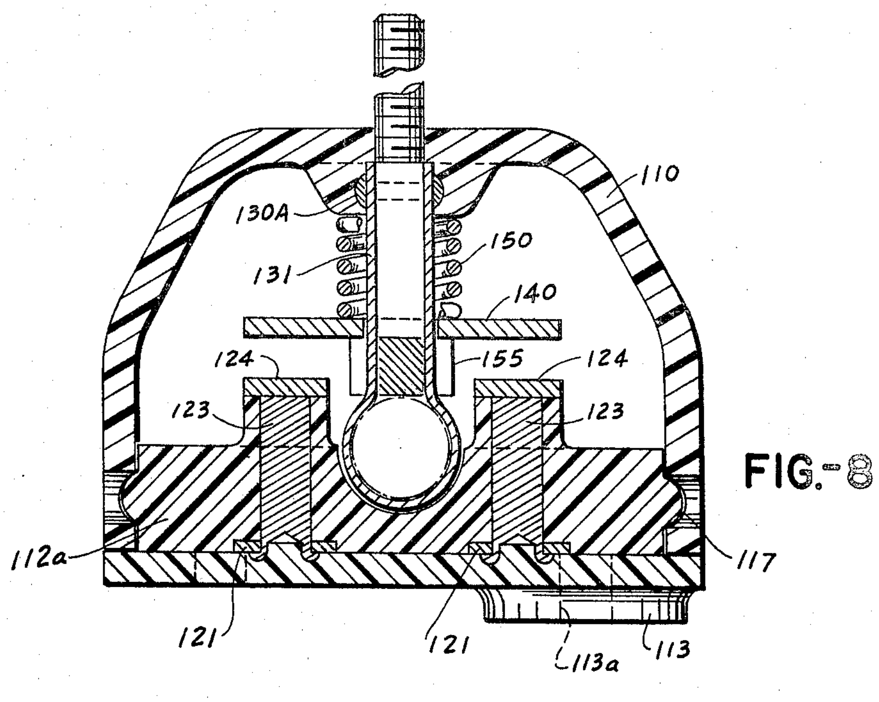
FIGURE 8 is a view taken along the lines VIII—VIII of FIGURE 6.

At an intermediate point on each of the integral clip extensions 121 there is provided an upstanding rod 123, see FIG. 8, which is in electrical and mechanical contact with the respective clip extension 121, illustratively by swaging. The rods 123, which are molded into a section 112A of the base assembly, have their upper ends connected to respective contacts 124.

Spaced above the pair of contacts 124 is a shorting bar 140 which in the instant embodiment is of generally rectangular shape and is disposed at right angles to the axis of the clips. The shorting bar includes a central bore 140A through which passes a center clip 131. The latter is formed from a metal strip which is bent at its central portion to encircle the over-voltage element 125 (see FIGURE 8) and with the ends disposed in a parallel relationship and joined to a ground stud 130 as by rivet 130A.

Encircling the center clip 131 is a spring 150, the upper end of which bears against the housing cover 110. The lower end abuts the shorting bar 140 and urges the same towards the contacts 124 of end clips 120. The tendency of spring 150 to force shorting bar 140 into contact with contacts 124 whereby the end clips and cartridge would be short-circuited and grounded, is prevented by the action of the fusible spacer 155 which has a roughly H shape with the center section disposed between the sides of the center clip 131. In the event of a prolonged over-voltage condition, the fusible pellet 155 will fuse whereupon spring 150 forces the shorting bar 140 into electrical contact with the contact surfaces 124. When this occurs the over-voltage device 125 and equipment connected thereto are short-circuited and grounded. Of course, the initial short-circuitry is provided by the protector 125.

The features mentioned in connection with the arrangement of FIGURES 1–4 apply as well to the embodiment in FIGURES 5–8. In addition the latter embodiment offers simplifications in structure which facilitate mass production of the protection apparatus.

Referring now to FIGURES 9 and 10, there is shown therein a gas filled over-voltage protector according to the invention which may be used in substitution for the previously described protector, which is characterized by simplicity of design as well as reliability, and which is especially amenable to low-cost, high speed, mass production techniques.

The over-voltage protection element of FIGURES 9 and 10 includes a cylindrical metal housing 200 which is illustratively of a high nickel alloy composition. The ends of cylinder 200 are each provided with a header including a ferrule 201 which is preferably of the same composition as the cylinder. Disposed coaxially in the ferrules in scaled relation therewith are insulative compression seals 202 which are preferably of glass or ceramic composition. The seals 202 are of annular shape and include central bores through which respective electrodes 203 pass. The external ends of the electrodes are provided with suitable connectors while the interior ends are spaced by a distance which depends upon the desired breakdown characteristics.

In the region of the gap between the electrodes, the central section 200 includes a rim section 205, the inner diameter of which is also adjusted in accordance with the desired tube rating. Thus embodied, the protector is filled with a suitable gas, such as Argon. Pressure will depend on desired rating.

In one preferred embodiment the housing 200 is provided with a ground lug 208 which is secured to a strap 207 encircling housing 200. A ground connection may thus be made directly to the tube housing.

The ease with which the foregoing arrangement may be produced will be apparent from the description of a typical assembly process as described below.

One of the glass-metal headers is welded to the body 200 at one end thereof. The tube assembly is then evacuated at a high temperature, e.g., 300° C., to de-gas all materials. The assembly is then transferred to a dry box which typically contains dry nitrogen. The Argon or other desired gas is injected into the dry box whereupon the tube is filled with gas. The opposite header assembly is then induction welded to the body 200 to complete the assembly. Testing for leaks and electrical characteristics then follows:

In FIGURE 11 there is illustrated the combination of the over-voltage tube of FIGURES 9 and 10 with an air-gap type protector such as made by the Western Electric Company, Cook Electric Company or Reliance Electric. By choice of proper connectors on leads 203 the tube of FIGURES 9 and 10 can be readily attached to such air gap assemblies without the need for modification. By this arrangement and with the protector 200 set to breakdown before the air-gap protector, all of the benefits provided by the gas-filled protector are added to the fail-safe features of the air-gap protector without impeding the latter.

In a typical application the striking voltage of the gas-filled tube is, say, 300 volts while the air-gap protector is adjusted for a 350–400 volt rating. Hence, the gas-filled protector will always operate first while the air-gap device will be activated only in the event that the gas-filled protector malfunctions.

As seen in FIGURE 11 such an assembly comprises the connection of leads 203 to the line terminals 220 and 221 of an air gap protector 225. The latter includes two sets of spaced electrodes 230, each set forming an air-gap and being connected between one of the lines to be protected and the ground point. The shell of tube 200 is similarly connected to the ground point.

In the practice and study of the invention, modifications will undoubtedly occur to those skilled in the art. The invention is thus not limited to the specific mechanisms and processes herein shown but departures may be made therefrom within the scope of the accompanying claims without departing from the principles of the invention and without sacrificing its chief advantages.

The term ceramic as used in the claims herein refers to materials commonly referred to as ceramic and as glass.

What is claimed is:

1. A housing for an overvoltage element having a casing for connection to ground and a pair of spaced electrodes, comprising an insulated movable section on said housing, terminal means adapted for connection to a circuit to be protected and to said electrodes and having means for releasably holding said element, case holding means connected to said movable section of said housing and to said element for removing said element from said releasable holding means when said movable section is displaced whereby the possibilities of shock and burn in removing said element are lessened and supplementary shorting means having fusible means in heat conductive relation to said over-voltage element, said fusible means being responsive to a sustained actuation of said element and juxtaposed relative to said element for shorting and grounding the electrodes thereof in the event of said sustained condition.

2. A housing as defined in claim 1 in which said insulated movable section includes a ground connection.

3. A housing as defined in claim 2 in which said ground connection is connected to said case holding means.

4. A housing as defined in claim 1 including a base to which said releasable holding means is connected and in which said movable section comprises a cover for said base.

5. A housing as defined in claim 1 in which said case holding means comprise a resilient connector releasably connected to said element.

6. A housing as defined in claim 1 in which said supplementary shorting means is connected to said movable section.

7. A housing as defined in claim 1 in which said case holding means includes a ground connection and comprises a resilient connector releasably connected to said casing and being conductive for supplying a circuit from said casing to said ground connection.

8. A housing as defined in claim 1 in which said case holding means comprise a resilient clip adapted to clamp said casing with a holding force which is greater than the net holding force exerted on said element by said releasable holding means.

9. Supplementary protection means for preventing the burn out of an overvoltage device and the equipment protected by same and wherein said overvoltage device has a casing and spaced contactors, comprising bridging means connected to ground and oriented to potentially short circuit said spaced contactors of said device, resilient means urging said bridging means toward a condition of electrical contact with said contactors, fusible means located to maintain said bridging means and said contactors in insulating relationship except during a condition of sustained overload threatening to burn out said device which condition causes said fusible means to fuse whereupon said bridging means are urged into electrical contact with said contactors, shorting and grounding same, and grounding means for grounding said casing independently of said fusible means and having a connection to said fusible means whereupon fusing of said fusible means causes said conductors to be grounded as well as shorted.

10. Protection means as defined in claim 9 including spring means on said shaft resiliently urging said bridging means towards contact with the contactors of said overvoltage device and in which said grounding means include a casing clamp for preventing dislodgement of said device by said spring means.

11. Protection means as defined in claim 9 in which said fusible means comprise a fusible element in pressure engagement with said overvoltage device and in engagement with said bridging means for maintaining said bridging means insulated from said overvoltage contactors except during sustained overload and in which said grounding means include means for maintaining said fusible element in operative position when said overvoltage device is absent from said protection means.

12. Protection means as defined in claim 10 including spaced resilient connectors on said casing clamp for connecting said overvoltage device casing to grounding.

13. A protection arrangement as defined in claim 10 in which said casing clamp is shaped to provide both clamping of said casing and engagement of said fusible means.

14. Protection apparatus for protecting a two wire circuit from transient and sustained overvoltage conditions comprising a housing, said housing having a first relatively fixed section including a pair of spaced connectors for receiving a generally longitudinally shaped overvoltage protector having electrodes and a casing, said connectors being connected to provide circuit connection from said circuit to said electrodes, resilient holding means, a movable section of said housing including a ground connection having one section for connection to a ground point and another section connected to said resilient holding means, said resilient holding means having a clamping force in excess of that provided by said connectors and having means supplying a circuit connection from said casing to said ground point whereby the removal of said movable section of said housing withdraws said protector from said circuit connectors and maintains said protector at ground, a bridging structure coupled to said ground connection and resiliently urged towards contact with said electrical connectors, and fusible means responsive to heating of said protector and located to insulate said bridging structure from said connectors except when said protector is subjected to overloads.

References Cited by the Examiner

UNITED STATES PATENTS

| | | | |
|---|---|---|---|
| 1,799,689 | 4/1931 | Jones. | |
| 1,874,407 | 8/1932 | Young. | |
| 1,974,956 | 9/1934 | Haffcke | 316—24 |
| 2,581,308 | 1/1952 | Smith | 200—114 |
| 2,789,254 | 4/1957 | Bodle et al. | 317—33 |
| 2,941,108 | 6/1960 | Collins et al. | 313—216 |
| 3,072,816 | 1/1963 | Podzuweit | 313—216 |
| 3,093,430 | 6/1963 | Wiley | 316—24 |
| 3,141,996 | 7/1964 | McGrath | 317—13 |
| 3,146,378 | 8/1964 | Grenier | 317—13 |

FOREIGN PATENTS

| | | |
|---|---|---|
| 472,312 | 9/1937 | Great Britain. |

MILTON O. HIRSHFIELD, *Primary Examiner.*

SAMUEL BERNSTEIN, STEPHEN W. CAPELLI, *Examiners.*

R. V. LUPO, *Assistant Examiner.*